United States Patent [19]
Carr et al.

[11] Patent Number: 4,756,267
[45] Date of Patent: Jul. 12, 1988

[54] TUBE MOORING LINE

[75] Inventors: Cecil A. C. Carr, Bath; Stuart H. Guy, Romsey, both of England

[73] Assignee: Secretary of State for Energy in Her Britannic Majesty's Government of the United Kingdom of Great Britain and Northern Ireland, London, England

[21] Appl. No.: 29,394

[22] Filed: Mar. 23, 1987

Related U.S. Application Data

[63] Continuation of Ser. No. 890,963, Jul. 29, 1986, abandoned, which is a continuation of Ser. No. 400,364, Jul. 21, 1982, abandoned.

[30] Foreign Application Priority Data

Jul. 27, 1981 [GB] United Kingdom ............... 8123128

[51] Int. Cl.⁴ .................................... B63B 21/00
[52] U.S. Cl. ............................................ 114/230
[58] Field of Search ........................ 114/215, 230; 267/64.11, 69, 79, 73, 138, 140.3, 148, 134; 87/6, 9, 11; 57/33; 188/269; 417/478

[56] References Cited

U.S. PATENT DOCUMENTS 3,839,983 10/1974 McAusland ............... 114/230
4,351,261 9/1982 Shanks ..................... 114/264

FOREIGN PATENT DOCUMENTS 2053303 7/1979 United Kingdom ........ 114/230
2054756 2/1981 United Kingdom ........ 114/230

OTHER PUBLICATIONS

*Tooling and Production* vol. 20, No. 12, Mar. 1955; p. 70.

Primary Examiner—Joseph F. Peters, Jr.
Assistant Examiner—Jesus D. Sotelo
Attorney, Agent, or Firm—William R. Hinds

[57] ABSTRACT

A tie line in the form of a mooring line comprising a tube of elastomeric material reinforced with coaxial layers of helically wound relatively inelastic filaments. Adjacent pairs of layers are spaced apart by the elastomeric material and their filaments are wound in oppositely handed helices. The tube contains a pressurized fluid which supplements the elastic properties of the tube in resisting an axial load on the tube. The mooring line may be used to moor a buoyant wave energy device, and may be combined with a turbine to form an electric power system.

7 Claims, 6 Drawing Sheets

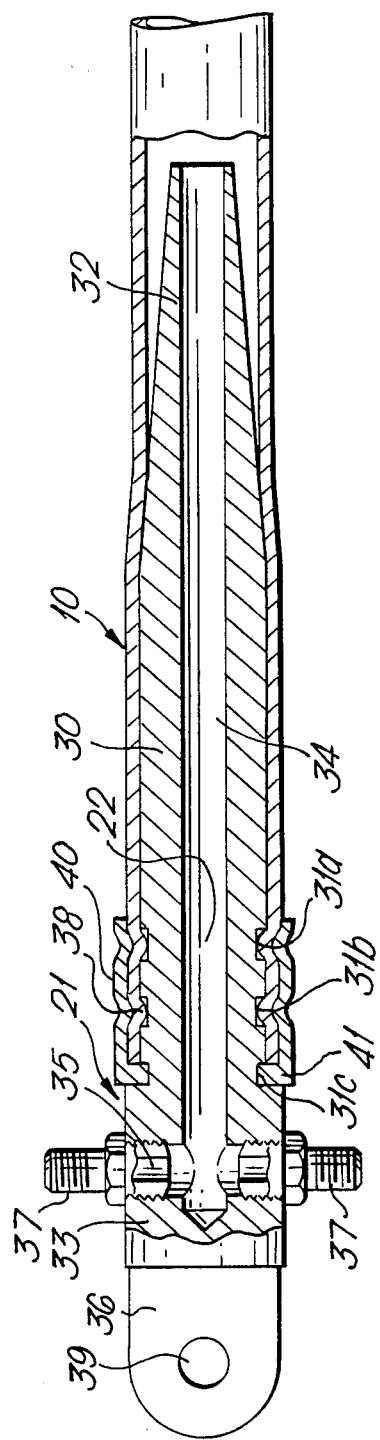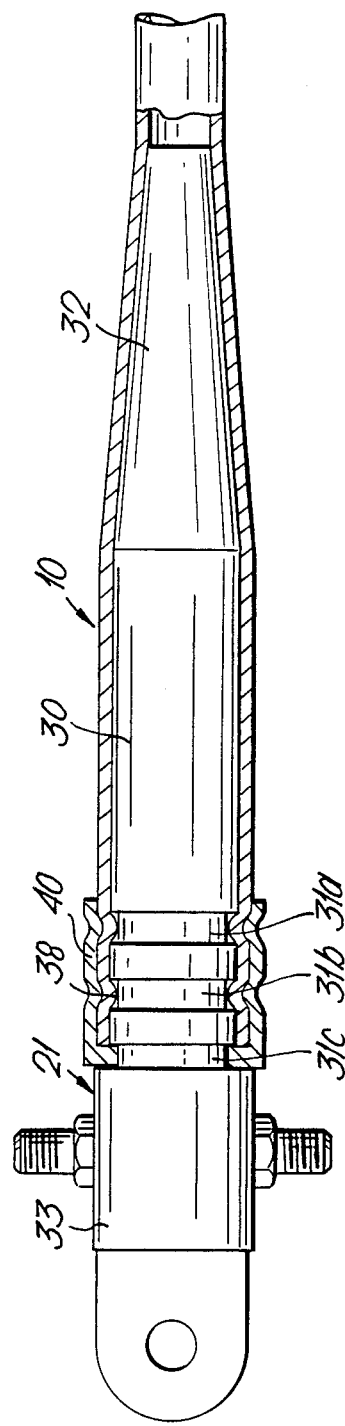

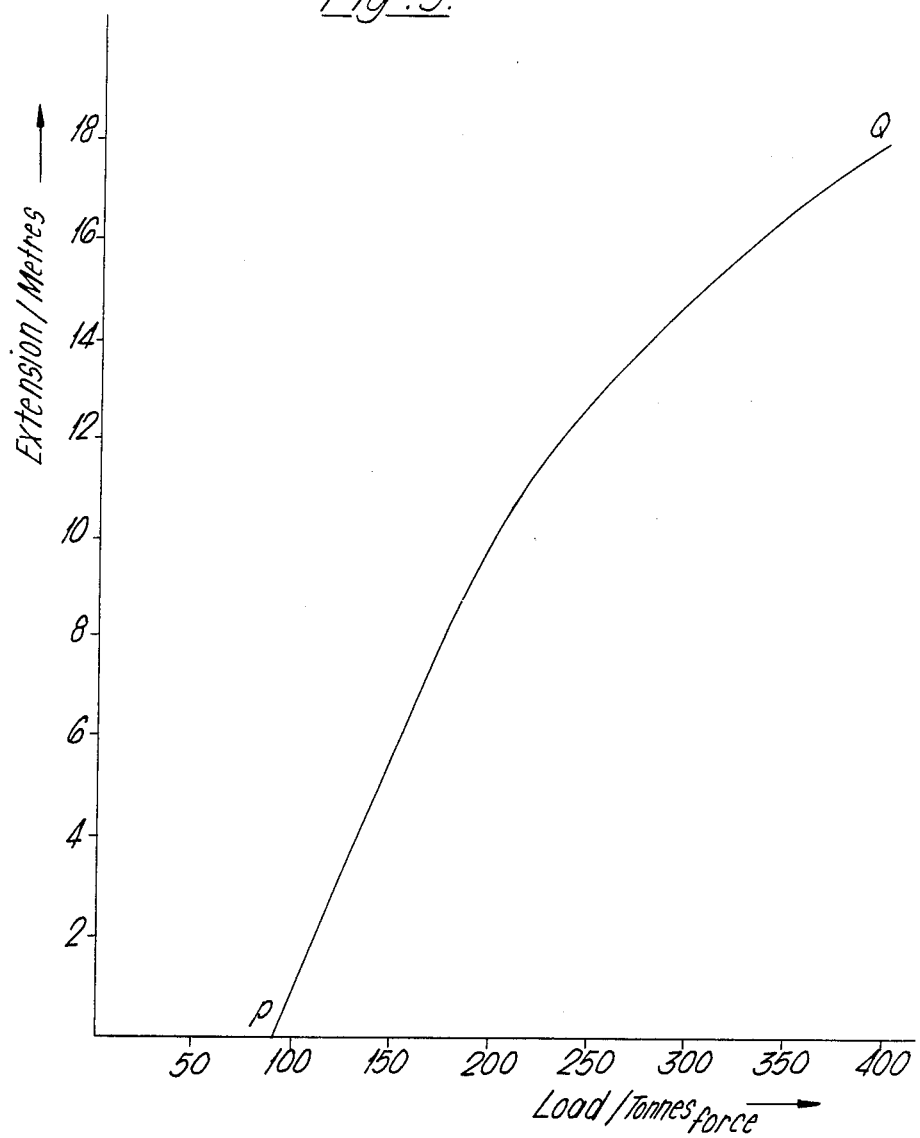

TUBE MOORING LINE

This application is a continuation of application Ser. No. 890,963, filed 07/29/86, which is a continuation of Ser. No. 400,364, filed 07/21/82, now both abandoned.

This invention relates to tie lines, and more particularly but not exclusively to tie lines in the form of mooring lines, for example for save energy devices. Such mooring lines must be able to withstand large tensile loads, but must be compliant, must not react chemically with water, and should have a relatively long fatigue life despite repeated cycles of stress and relaxation. As used herein the expression "mooring line" is to be interpreted as encompassing any line used in the marine field for the control of loads to which it is attached, as for example in towing and in moorings fixed to the sea bed.

The invention therefore provides a mooring line including a tube of elastomeric material incorporating relatively inelastic filaments to reinforce the elastomeric material, which filaments extend helically along the length of the tube in at least two layers radially displaced from each other by the elastomeric material, the filaments in a layer extending in an oppositely handed helix with respect to the filaments in an adjacent layer, each helix having a plurality of turns, and at least a substantial proportion of the turns making an angle to the axis of the helix less than the "neutral angle" (as herein defined), the tube being adapted to contain a pressurized fluid, and having port means for connecting the tube to means for pressurizing the fluid, whereby the pressurized fluid supplements the elastic properties of the tube in resisting an axial load on the tube.

The pressure may be selected in relation to the axial load so that the fluid produces at least a substantial proportion of the restoring force for decreasing the length of the tube as the axial load relaxes.

The fluid in the tube may be a gas, and the pressure means may be a source of pressurized gas. Alternatively, the fluid in the tube may comprise a liquid, and the pressure means a hydro-pneumatic accumulator. The hydro-pneumatic accumulator may comprise a cylinder having a piston member therein, and a port at each end of the cylinder, the stroke of the piston member being arranged to close the respective port at the one end and/or at the other end of the stroke.

Each of the ends of the tube may be held by a respective coupling means comprising, a plug member at least partly of truncated conical form having a bore therethrough and about which plug member the tube is locatable, an end member against which the plug member is locatable, the end member having a duct communicable with the bore of the plug member and with the port means, sealing means on the plug member and arranged to abut the end member, and a clamping member adapted to bear against the conical surface at said one end of the tube and to engage the end member, thereby to urge the tube on to the plug member and towards the end member.

The invention also includes an electric power system comprising a mooring line of the invention, and a turbine means arranged to be driven by the fluid displaced by the mooring line.

The elastomeric material may be natural or synthetic rubber, and the filaments may be of steel, carbon fibre, natural fibre, rayon, nylon, polyamide, polypropylene, or glass-fibre.

The invention will now be further described by way of example only and with reference to the accompanying drawings, in which:

FIG. 2 shows a longitudinal sectional view of part of the lower end of the mooring line of FIG. 1;

FIG. 3 shows, partly in section, the effect of an axial load on that part of the mooring line shown in FIG. 2;

FIGS. 4a and 5 show graphs of extension against load for the mooring line of FIG. 4;

Figure 1:
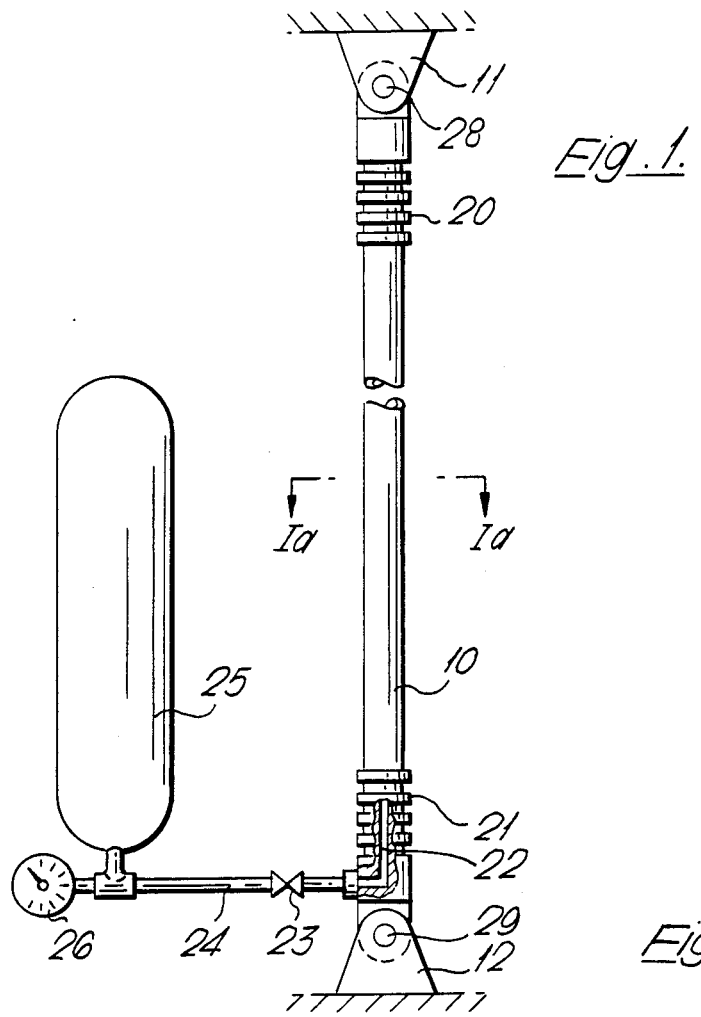
FIG. 1 shows a partly cut away view of a mooring line.
Figure 1A:
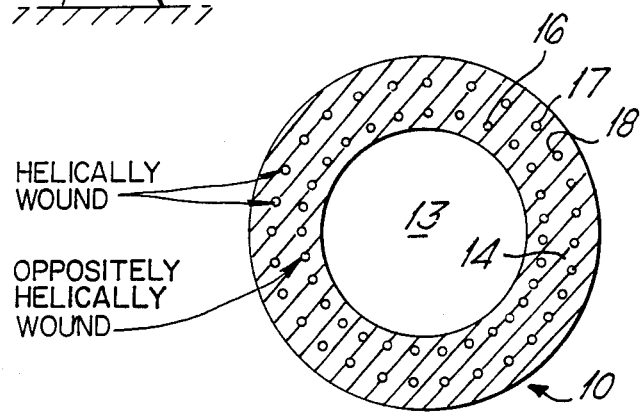
FIG. 1a shows a sectional view on the line Ia—Ia of FIG. 1.

Referring to FIGS. 1 and 1a, a mooring line is shown comprising a tube 10 having a bore 13 and pivotally connected between an upper pivotal mounting 11 and a lower pivotal mounting 12. The tube 10 is made of vulcanised rubber 14 and incorporates reinforcement in the form of an inner cylindrical layer 16 and a co-axial outer cylindrical layer 17 of helically wound glass-fibre filaments 18. The inner layer 16 is separated from the outer layer 17 by the rubber 14, and the filaments 18 in the inner layer 16 are wound in an opposite-handed relationship to the filaments 18 in the outer layer 17. When the tube 10 is axially unstrained the filaments 18 make an angle of about 45° with the longitudinal axis of the tube 10.

Each end of the tube 10 has an end-fitting 20, 21 connected to a pivot pin 28, 29 at the respective pivotal mounting 11, 12. There is a duct 22 through the lower end-fitting 21 which at one end communicates with the bore 13 of the tube 10 and at the other end communicates with a pipe-line 24, the pipe-line 24 being connected to a gas cylinder 25 and to a pressure gauge 26 and including a variable flow-restricting valve 23.

For a fixed length of filament 18, the volume enclosed by a single helically wound filament 18 depends on the angle between the filament 18 and the axis of the helix, and is a maximum when the angle is equal to arc sec $\sqrt{3}$ (approximately 55°) and herein called the "neutral angle". If the length of the helix is increased the angle decreases and so for a helix in which the filaments 18 make an angle to the axis of less than the neutral angle an increase in the length of the helix leads to a decrease in the volume enclosed.

Hence, in operation, with the tube 10 used as a mooring line and the cylinder 25 and the bore 13 containing a pressurized gas (e.g. air), the application of a varying external axial tensile load on the tube 10 by displacement of the upper mounting 11 causes the tube 10 to lengthen when the load increases, with a consequent decrease in the volume of the bore 13 causing an increase in the gas pressure in the bore 13. When the axial load relaxes, the gas pressure provides the restoring force to increase the volume of the bore 13 and pull the upper mounting 11 back towards the lower mounting 12. In effect the gas in the cylinder 25 and in the bore 13 acts as a spring reacting to the external load on the tube 10, with the flow-restricting valve 23 providing a damping effect on this spring action.

Figure 1B:
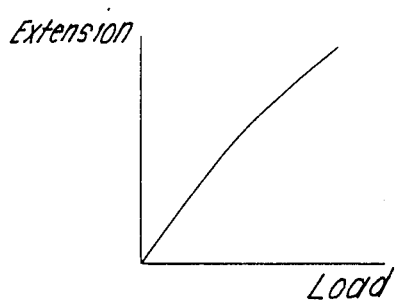
FIG. 1b shows a graph of extension against load for the mooring line of FIG. 1.

The dependence of the extension of the tube 10 in FIG. 1 on the load applied to the tube 10 is shown graphically in FIG. 1b, the slope of the graph being a function of the initial gas volume.

For ease of manufacture it is convenient to produce the tube 10 from continuous lengths of tubing which can be cut to the length required for a particular application. The tube 10 will then be joined to the lower and to the upper end-fittings 20, 21, and in FIG. 2 there is shown an example of a suitable lower end-fitting 21.

The lower end-fitting 21 is made of a rigid material such as steel and comprises a cylindrical body portion 30 of diameter slightly greater than that of the axially unstrained tube 10 and having three circumferential grooves 31a, 31b, 31c, a co-axial conical body portion 32 extending from one end of the cylindrical body portion 30, and an end portion 33 of square cross-section being joined to the other end of the cylindrical body portion 30. The end portion 33 includes a tang 36 having a hole 39 to locate the tang 36 on the pivot pin 29. The duct 22 through the end-fitting 21 is provided by a cylindrical hole 34 which extends axially through the conical body portion 32 and the cylindrical body portion 30 into the end portion 33 and communicates with a transverse hole 35 through the end portion 33 perpendicular to the cylindrical hole 34. The two ends of the transverse hole 35 are threaded to locate pipe connections 37, one of which may be connected to the pipe line 24 and the other closed by a plug (not shown). The upper end-fitting 20 is the same as the lower end-fitting 21 except that the duct 22 is omitted.

To attach the end-fitting 21 to the tube 10, an end portion 38 of the tube 10 is fitted over the conical body portion 32 and the cylindrical body portion 30, and is clamped thereto by a metal ferrule 40 which depresses part of the end portion 38 of the tube 10 into the circumferential grooves 31a, 31b and has a lip 41 which locates in the circumferential groove 31c.

In FIG. 3 the tube 10 is shown subjected to an axial load so that its diameter has decreased such that the tube 10 increases its grip on the conical body portion 32. The cone angle of the conical body portion 32 is chosen so that as the axial load increases the tube 10 deforms tightly around a gradually increasing length of the conical body portion 32, the length of the interface between the tube 10 and the end fitting 21 being designed to limit the shear stress in the rubber 14 of the tube 10 to an acceptable value in the vicinity of the end fitting 21 while enabling sufficient frictional grip to be produced to withstand the axial load.

Some of the advantages of the end-fitting 21 are that, as the axial tension in the tube 10 increases so too does the area of contact between the tube 10 and the end-fitting 21, and also abrupt changes in curvature of the rubber 14 are avoided at the end of the end-fitting 21. Furthermore, if internal pressure is applied inside the tube 10 with the end fittings 20, 21 attached end the tube 10 at its unstrained length, the internal pressure induces an axial tension in the tube 10 tending to shorten the tube 10, and owing to the effect of the helically wound filaments 18 the tube 10 grips the cylindrical body portion 30 of the end fittings 20, 21 more firmly as it resists the induced axial tension. This effect will apply even if the angles between the filaments 18 and the axis of the tube 10 are equal to or greater than the neutral angle in the vicinity of the cylindrical body portion 30 as a result of local distortion of the tube 10 as it is fitted over the cylindrical body portion 30.

Figure 4:
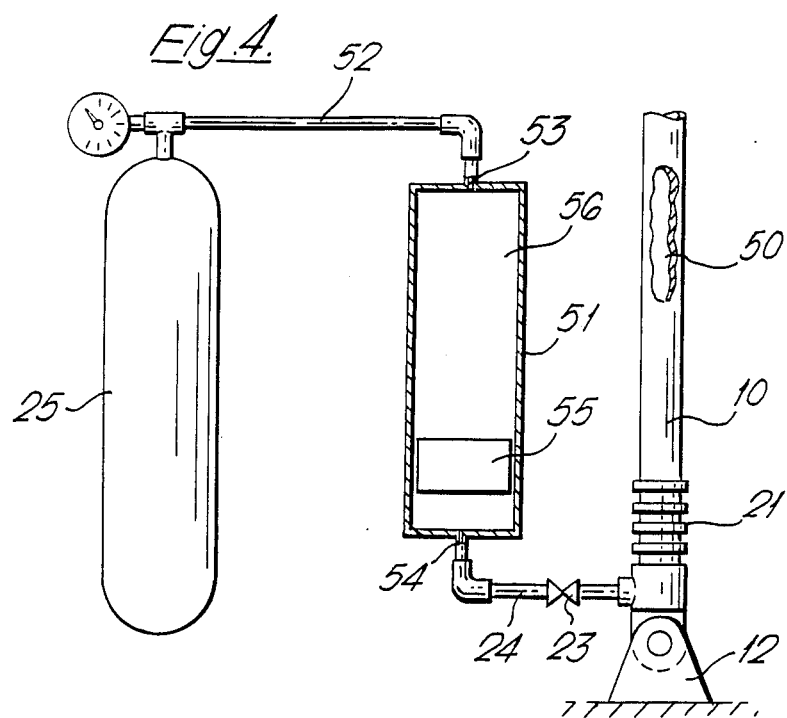
FIGS. 4 shows in part section a side view of a modification of the mooring line of FIG. 1.

FIG. 4 shows an alternative type of mooring line differing from that of FIG. 1 only in that the bore 13 of the tube 10 is full of liquid 50 pressurized by a hydropneumatic accumulator 51. The pipe line 24 is now connected to a liquid port 54 at one end of the accumulator 51, and the other end of the accumulator 51 communicates through a gas port 53 to a gas line 52 connected to the gas cylinder 25 which contains a pressurized gas 56. The accumulator 51 contains a movable piston 55 which separates the liquid 50 from the gas 56, and when the piston 55 is at the lower end of its stroke it closes the liquid port 54 and prevents the gas 56 from the gas cylinder 25 from entering the pipe line 24, and when at the upper end of its stroke the piston 55 closes the gas port 53 and prevents the liquid 50 from the tube 10 from entering the gas line 52.

Figure 4A:
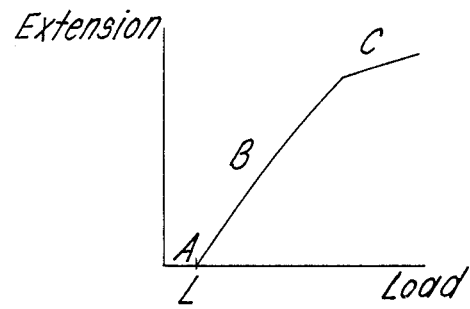

The mooring line shown in FIG. 4 has a spring characteristic similar to that of the mooring line of FIG. 1, but can have the additional features of a pre-load at zero extension, and a stiff end-cushion effect at large extensions, obtainable as follows, with reference to the graph of FIG. 4a.

In the initial state there is no axial tensile load on the tube 10, and the piston 55 is at the lower end of its stroke, closing the liquid port 54. If the liquid 50 in the tube 10 is initially at a lower pressure than the gas 56 in the accumulator 51, then as an increasing load is applied to the mooring line, the tube 10 will not extend (stage A) until the pressure of the liquid 50 within it reaches the value of the gas pressure in the accumulator 51, this occurring at a load L constituting the preload. The tube 10 will then extend (stage B) causing the volume of the bore 13 to decrease, thereby displacing the liquid 50 from the tube 10 into the accumulator 51 and causing the piston 55 to rise. When the piston 55 reaches the upper end of its stroke and closes the gas port 53, further displacement of the liquid 50 out of the tube 10 into the accumulator 51 is prevented, so further increase of axial load on the tube 10 produces only a small increase of extension (stage C) governed mainly by the stiffness of the reinforcing filaments 18, thus providing the stiff end-cushion effect. If the liquid 50 in the tube 10 is initially at the same pressure as the gas 56 in the accumulator 51, the mooring line will have no pre-load, but will otherwise react to an increasing load in the same manner.

In FIG. 5 is shown a graph of extension against load for one example of the mooring line of FIG. 4, having the following characteristics:

initial length of tube 10 = 80 m
initial mean diameter of cylindrical layers 16, 17 of helically wound filaments 18 = 0.38 m
initial angle of helically wound filaments 18 to the axis of the tube 10 = 45°
volume of accumulator 51 and gas cylinder 25 = 7 m3
initial pressure of the gas 56 = 10 MPa At point P on the graph of FIG. 5, the angle of the helical windings to the axis and the pressure within the tube 10 have the values 45° and 10 MPa respectively, while at point Q on the graph the corresponding values are 30° and 20 MPa.

The mooring lines of FIGS. 1 and 4 may be used to moor a buoyant wave energy device (not shown). An example is for the mooring of a wave energy conversion device of the type described in British Patent Specification No. 1580805 (U.S. Pat. No. 4,164,383) which is incorporated by reference herein. For convenience the body of the device is referred to as the hull and in this example is 220 m long. Four identical mooring lines, one to each corner of the hull are connected to two anchorages, with the two lines from either end of each side of the hull sharing an anchorage opposite the midpoint of the hull and displaced some 175 meters from it. The lines in plan therefore form a diamond with the hull acting as one diagonal.

Each line is a 200 m long tube 10 with 10 m long end fittings 20, 21, and the anchorage is a drilled and grouted pile. A pre-tension of 250 tonnes will provide that the line should never go slack and so should avoid snatch loading. As each device has completely independent moorings, the relative positions of adjacent devices can be adjusted to follow the seabed contours and to avoid areas of unsuitable seabed conditions. The moorings are designed for a range of water depths from 60 to 80 meters.

The "diamond" layout was initially chosen for its simplicity and flexibility but was found on investigation to produce a very stable mooring system. The geometry of the layout minimises the angular rotation in plan between the device hull and the mooring lines, thus simplifying the mooring joint detail. The mooring layout leaves the sea ahead and astern of the devices free of obstructions to shipping and keeps the mooring lines well clear of the power cables which are connected at the ends of the hull and run on a lazy 'S' from one device to the next.

As the tubes 10 are connected to the hulls nine meters below the still water level, the water surface is not obstructed for the shallow draught vessels used during the installation procedure.

From tank testing the following general characteristics of this system may be given:

(a) For a given mooring layout, the loads in the mooring lines increase significantly with increasing hull displacement, and with improved hull stability in roll.

(b) There is an approximately linear relationship between the stiffness of the mooring and the mooring loads, suggesting that the moorings do little to resist the oscillatory motions of the hull.

(c) The dynamic mooring loads are made up of two components, one of wave period and one at a longer period, corresponding to the system's natural frequency.

Figure 6:
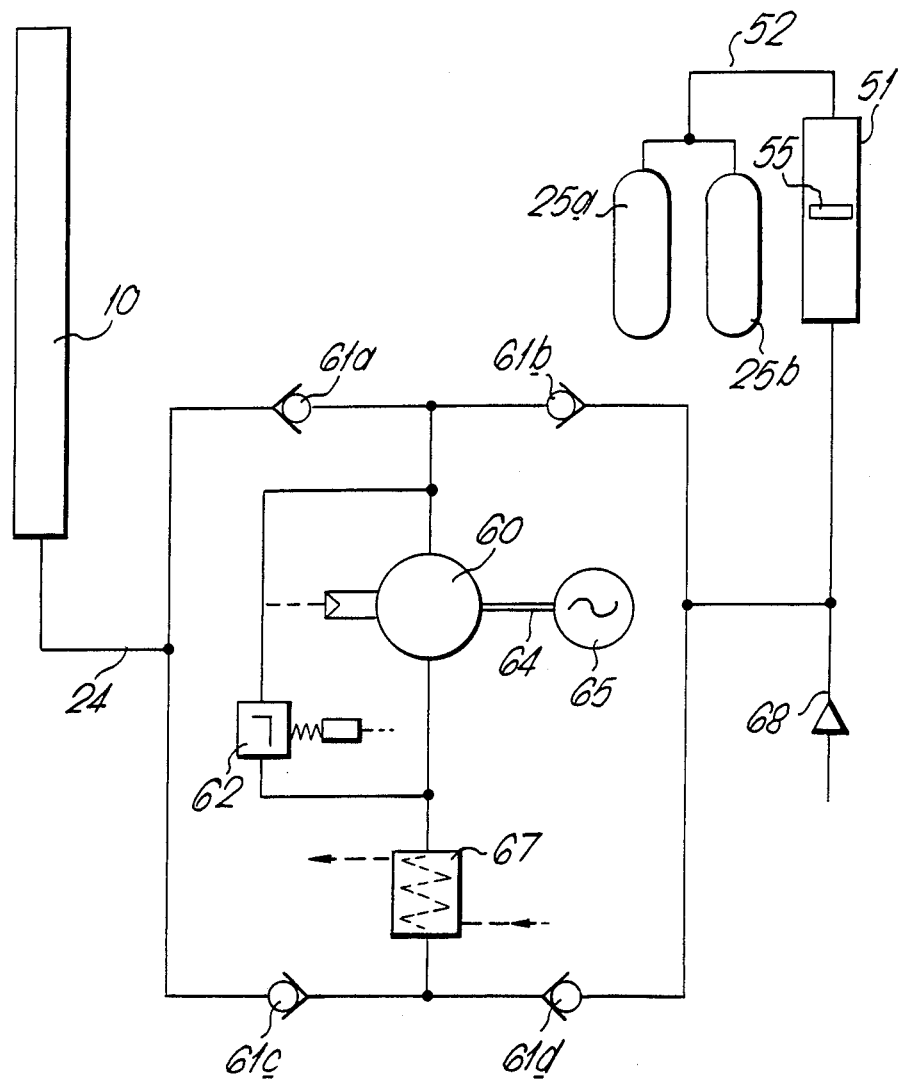
FIG. 6 shows in diagrammatic form an electric power system including a mooring line of FIG. 4.

The mooring line may be combined with means for generating electric power, an arrangement which may be particularly suitable where used for mooring a wave energy device as described above. An example is illustrated in diagrammatic form in FIG. 6 which shows an electric power system comprising the mooring line of FIG. 4 and a uni-directional hydro-turbine 60 connected into the pipe-line 24 between the tube 10 and the accumulator 51, the flow restricting valve 23 being omitted from the system. The accumulator 51 is pressurized by two gas cylinders 25a, 25b connected in parallel to the gas-line 52. The flow of the liquid 50 (e.g. water) through the turbine 60 due to the alternate extension and contraction of the tube 10 is rectified by an arrangement of non-return valves 61a, 61b, 61c, 61d, and a pressure relief and by-pass valve 62 is provided in parallel with the turbine 60. The turbine 60, which is preferably of the Francis type, is joined by a shaft 64 to an alternator 65. The system also includes a heat exchanger 67 to dissipate heat from the liquid 50 produced as a result of system losses, and it is advisable to provide an inlet 68 for the initial charging of the system with the liquid 50 and for any subsequent make-up of the liquid 50. The turbine 60, alternator 65, accumulator 51 and gas cylinders 25a, 25b could form a compact module to be mounted on a structure (not shown) adjacent to the pivotal mounting 12 of the mooring line of FIG. 4.

In operation of the electric power system, with the tube 10, the turbine 60, and the pipe line 24 full of liquid 50, extension of the tube 10 due to an increase in the axial load on the mooring line causes liquid 50 to be ejected from the tube 10 to flow through the pipe line 24, the valve 61a, the turbine 60, the heat exchanger 67, and the valve 61d into the accumulator 51, thus moving the piston 55 and increasing the gas pressure in the accumulator 51 and the gas cylinders 25a, 25b. When the axial load on the mooring line decreases, the gas pressure in the accumulator 51 causes the liquid 50 to flow out of the accumulator 51, through the pipe line 24, the valve 61b, the turbine 60, the heat exchanger 67, the valve 61c, and into the tube 10, thus decreasing the length of the tube 10 due to the increase in volume of the bore 13. Hence as the axial load on the mooring line alternately increases and decreases, the liquid 50 is forced to flow in alternate directions between the tube 10 and the accumulator 51, the flow being rectified by the valves 61a, 61b, 61c, 61d so as to produce uni-directional flow of the liquid 50 through the turbine 60.

Although the accumulator 51 has been described as containing a piston 55, the piston 55 can be omitted, although the characteristics of the pre-load L and the stiff end cushion effect C would thereby be lost. Where a piston 55 is provided, the piston 55 may sealingly separate the liquid 50 from the gas 56, or it may float on the surface of the liquid 50 in a substantially vertical accumulator 51. For some applications the additional damping provided by the flow-restricting valve 23 may not be necessary, and the valve 23 may be omitted. Furthermore, the use of a gas cylinder 25 and an accumulator 51 might be dispensed with, the tube 10 being pressurized with a fluid and subsequently being sealed, for example by the valve 23 in FIG. 1 to provide a particular tension/extension charactistic of the mooring line. The fluid might comprise a gas, and a proportion of the tube 10 might be filled with a liquid.

In this way the spring characteristic of the mooring line may be controlled over a wide range by varying the volume of gas in the tube 10 or connected to it externally in gas cylinders 25. The spring rate may be increased by partially filling the tube 10 with liquid or may be decreased by connecting the tube 10 to external gas storage (as in cylinders 25). The extension against load curve may be altered by controlling the gas pressure.

In many mooring applications the object is held in position by an array of mooring lines pre-tensioned to prevent them going slack and causing snatch loading. The use of the mooring line of the examples of the present invention enables the pre-tension to be applied by pressurizing the tube 10 after the mooring line has been attached at each end, the pressurization causing the tube 10 to contract and tighten the line.

Figure 7:
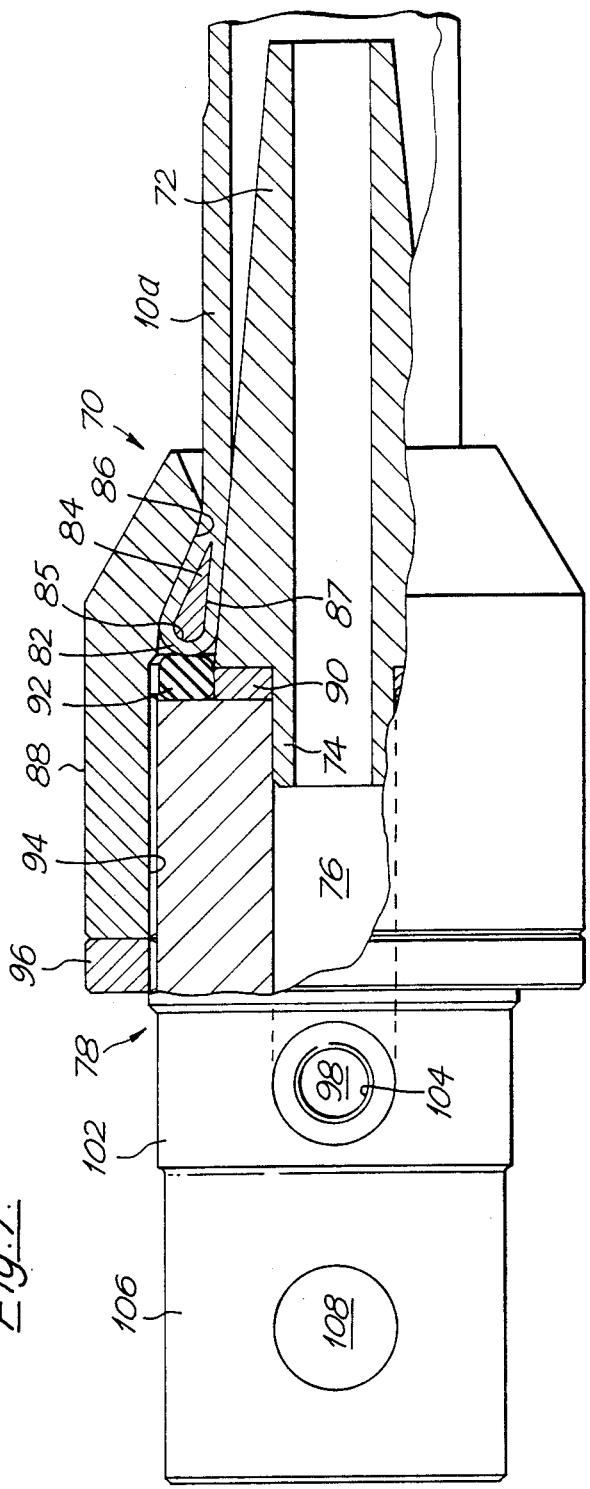
FIG. 7 shows an alternative form of the view of FIG. 2.

When the mooring line is to be used for applications involving particularly high loads and pressures, alternative end-fittings might be used as shown in FIG. 7 to which reference is made. In FIG. 7 a coupling device in the form of a lower end-fitting 70 is shown constructed essentially from a rigid material such as steel, and comprising a conical plug 72 having a cylindrical spigot 74 which locates as a clearance fit in a duct 76 of an end member 78. The plug 72 has a conical included angle of about 10°, and has an axial bore 80 therethrough to connect with the duct 76. A vulcanised rubber tube 10a similar in most respects to the tube 10 of FIGS. 1 and 1a, locates about the plug 72 but at an end 82 of the tube 10a adjacent to the end member 78 an aluminium ferrule 84 having a rounded end 85 is encased in the tube 10a at the end 82. In constructing the tube 10a, helically wound glass-fibre filaments (not shown) extending along the tube 10a are wound round the ferrule 84 and then wound back on the tube 10a far enough for a strong bond to be formed when the rubber of the tube 10a is cured. The ferrule 84 is positioned divergent with respect to the end 82 of the tube 10a, having an inner surface 87 of the same conical angle as that of the plug 72 and a wedge angle typically of about 20°, to arrange that the end 82 is of conical form and becomes trapped between an inner conical face 86 of an internally threaded connector 88 and the plug 72. A steel spacer ring 90 on the spigot 74 has a thickness selected to take up manufacturing tolerances at the tube end 82, and an 'O' ring seal 92 on the spacer ring 90 is compressed between the tube end 82 and the end member 78 to maintain a fluid-tight seal under conditions of light or zero tension in the tube 10a. The connector 88 engages a threaded portion 94 of the end member 78 and is held thereon by a lock nut 96.

The duct 76 of the body 78 communicates with a transverse hole 98 at a square-shaped portion 102 of the end member 78, each end 104 (only one is shown) of the hole 98 being threaded to locate pipe connections (not shown). A tang 106 having a hole 108 to locate the tang 106 on a pivot pin (not shown), extends axially from the square-shaped portion 102.

In use of the end fitting 70 with the tube 10a used as a mooring line in a similar manner to that of the tube 10 of FIGS. 1 and 1a, the effect of the wedge-section ferrule 84 in reacting against the connector 88 as a tensile load on the tube 10a increases, causes the grip of the rubber of the tube 10a on to the glass fibre filaments to increase and thus to resist the tendency of the rubber-to-rubber bond to break along the overlapped lengths of the filaments at the end 82.

An upper end fitting (not shown) may be made the same as the lower end-fitting 70 except that the duct 76, and the bore 80 are omitted.

The ferrule 84 is made from a corrosion resistant material to resist chemical attack during the construction of the tube 10a, and suitable alternative materials to aluminium may be used, for example cadmium plated mild steel. The end fitting 70 may be made generally from a cadmium plated mild steel, and subsequently treated with an epoxy paint. However, if desired a more corrosion resistant metal such as stainless steel may be used. The wedge angle of the ferrule 84 is not critical, and may be selected in conjunction with the conical angle of the conical face 86 to provide a required relationship of axial displacement and radial load. If desired, the included angle of the plug 72 may also be changed.

In a modification of the end fitting of FIG. 7, the plug 72 is formed with, a cylindrical portion extending from the end adjacent the end member 78 through a predetermined axial distance (see below), and a .conical portion from this cylindrical portion to the end of the plug 72 within the tube 10a. In this case the ferrule 84 is made with a cylindrical inner surface 87 but has the same wedge angle (~20°). In drawing the tube over the ferrule 84 and folding the tube back over on itself during manufacture, the overlap is not as great as that illustrated in FIG. 7 and would terminate just beyond the right hand end (as seen in FIG. 7) of the connector 88. The axial extent of the cylindrical portion of the plug 72 is arranged at least to coincide with the extent of the folded over portion of the tube 10a. This modified arrangement reduces the stress in the folded portion of the tube 10a which arises because the helical filaments in the portion folded back are of opposite hand to those in the main body of the tube.

An alternative electric power system could combine the mooring line of FIG. 1 with a gas turbine (not shown), and it will be understood that although the electric power system has been described as including a uni-directional turbine 60 and a rectifying arrangement of non-return valves 61a, 61b, 61c, 61d, a bi-directional turbine may be used instead, the non-return valves 61a, 61b, 61c, 61d being omitted.

Although only two layers 16, 17 of filaments 18 have been shown in FIG. 1a, additional layers of filaments 18, preferably an even number of layers, may be provided.

In addition to the applications described above, the mooring line also has a number of other applications. For example for mooring a drilling rig. The stiffness of the mooring array can be adjusted to suit operating conditions by varying the pressure and volume of the connected gas storage. Positional control may be effected by differential adjustment of the mooring lines by changes in gas pressure to adjust the length of a mooring line.

In another example, for mooring a large tanker to a jetty ten or more lines may be required and these all have to be adjusted frequently by winches to compensate for tidal changes and loading conditions. The high compliance of the tube mooring lines of the present invention should reduce changes in load, and adjustments may be effected by control of gas pressure, thereby eliminating the need to operate the winches.

In another example, a tube mooring line of the present invention used in series with a conventional towing rope for ship towing would by virtue of its high compliance and strain capacity, reduce snatch loads.

The high compliance (which reduces loads) and longer life expectancy of the tube mooring line of the present invention may also be expected to make it a more cost effective mooring line for large buoys than conventional moorings.

It will be appreciated that the invention provides a tie line comprising a tubular elastic member arranged to be internally pressurized by fluid means.

We claim:

1. A mooring line including a tube comprising elastomeric material incorporating relatively inelastic filaments to reinforce the elastomeric material, which filaments extend helically along the length of the tube in at least two layers radially displaced from each other by the elastomeric material, the filaments in a layer extending in an oppositely handed helix with respect to the filaments in an adjacent layer, each helix having a plurality of turns, and at least a substantial portion of the turns making an angle to the axis of the helix less than the "neutral angle", the tube being adapted to contain a pressurized fluid, and port means at the tube for conencting the tube to means for pressurizing the fluid at a pressure selected to produce a predetermined modification in the elastic properties of the tube in resisting an axial load on the tube, wherein at least at one end of the tube a ferrule of wedge cross-section is incorporated in the tube, so as to produce a conical outer surface of the tube at said one end.

2. A mooring line as claimed in claim 1, wherein at least some of the filaments in a said layer thereof extend round the ferrule and then extend at least partially back along the tube.

3. A mooring line as claimed in claim 2, including coupling means at said one end of the tube, the coupling means comprising a plug member at least partly of truncated conical form and defining a bore therethrough and about which plug member the tube is locatable, an end member against which the plug member is locatable, the end member having a duct communicable with the bore of the plug member, sealing means on the plug member arranged to abut the end member, and a clamping member adapted to bear against the conical outer surface at said one end of the tube and to engage the end member, thereby to urge the tube on to the plug member and towards the end member.

4. A mooring line as claimed in claim 3, wherein the inner surface of the ferrule is of conical form and of the same conical angle as that of the plug member.

5. A mooring line as claimed in claim 3, wherein the sealing means is disposed adjacent to said one end of the tube, so as to locate between said one end and the end member when the clamping member engages the end member.

6. A mooring line as claimed in claim 3, wherein a spigot portion of the plug member is locatable in the duct of the end member.

7. A mooring line as claimed in claim 3, wherein the clamping member comprises a sleeve having a convergent end to engage the conical said one end of the tube and being screw threaded to engage a corresponding screw thread in the end member.

* * * * *

UNITED STATES PATENT AND TRADEMARK OFFICE
CERTIFICATE OF CORRECTION

PATENT NO. : 4,756,267
DATED : July 12, 1988
INVENTOR(S) : Cecil A. C. Carr and Stuart H. Guy It is certified that error appears in the above—identified patent and that said Letters Patent is hereby corrected as shown below:

Under the heading "Foreign Application Priority Data" on the front page of the printed patent (the information page), the following additional foreign application priority data is added:

Jul. 6, 1982 [GB]   United Kingdom ......... 8219453

Signed and Sealed this

Seventeenth Day of January, 1989

Attest:

DONALD J. QUIGG

*Attesting Officer*  *Commissioner of Patents and Trademarks*